W. WELCH.
STALK HEADER AND ENSILAGE CUTTER.
APPLICATION FILED DEC. 14, 1911. RENEWED FEB. 12, 1915.
1,154,464.
Patented Sept. 21, 1915.
4 SHEETS—SHEET 1.
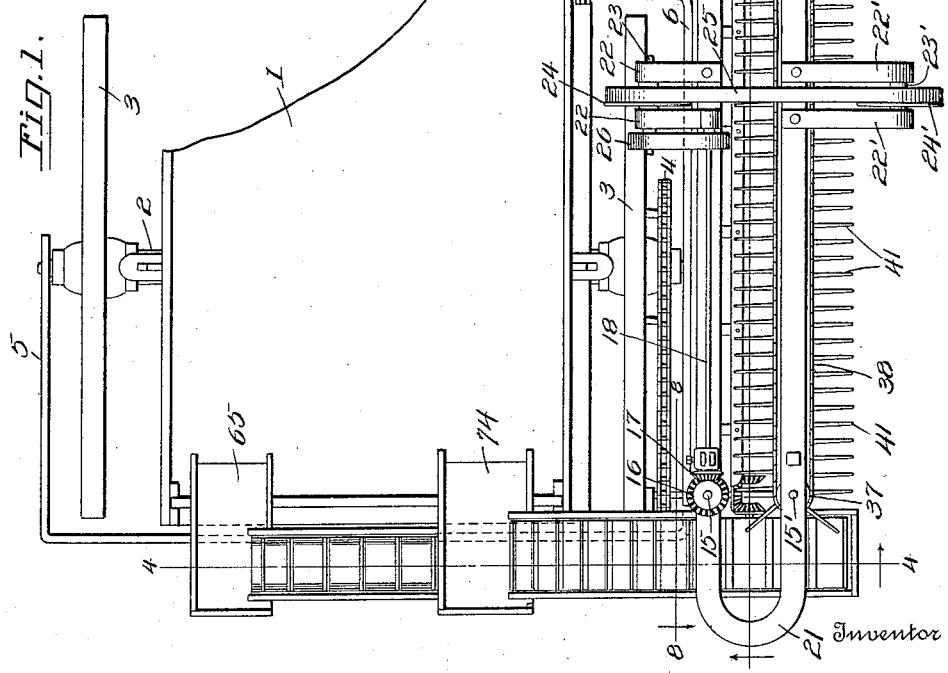
Witnesses
F. C. Gibson
Wm Bagger
Inventor
William Welch
By Victor J. Evans
Attorney

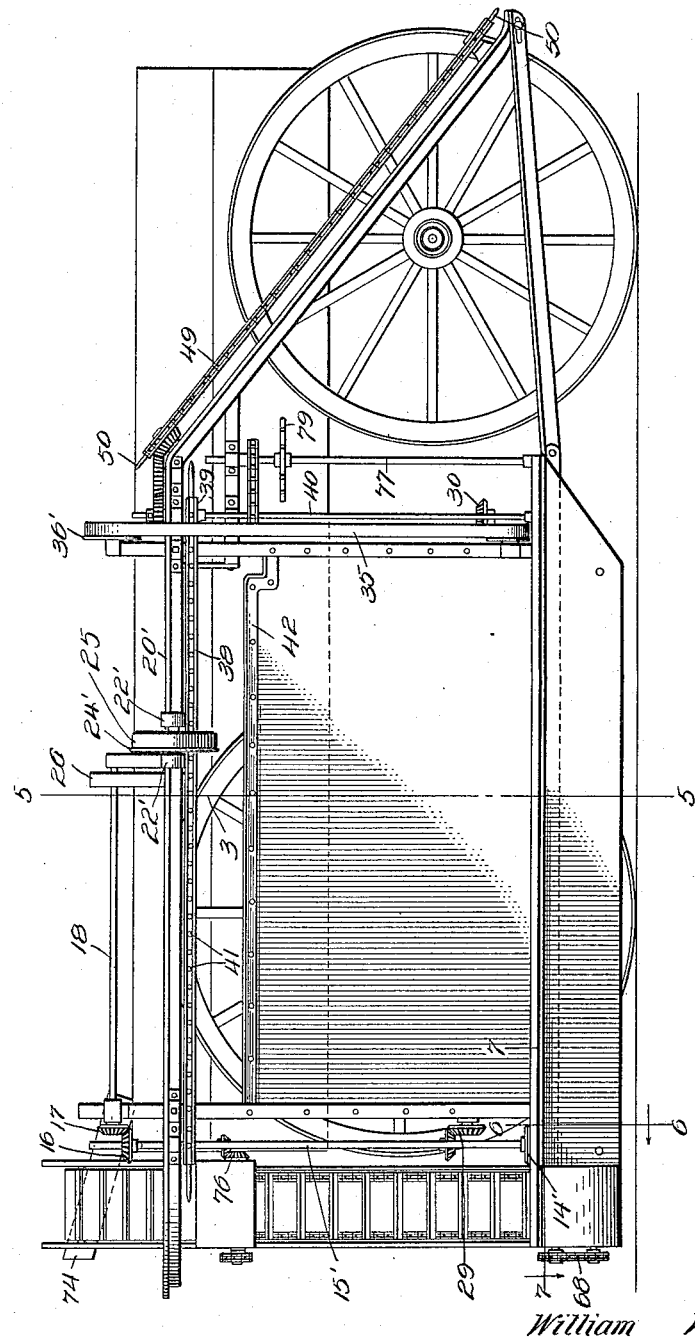

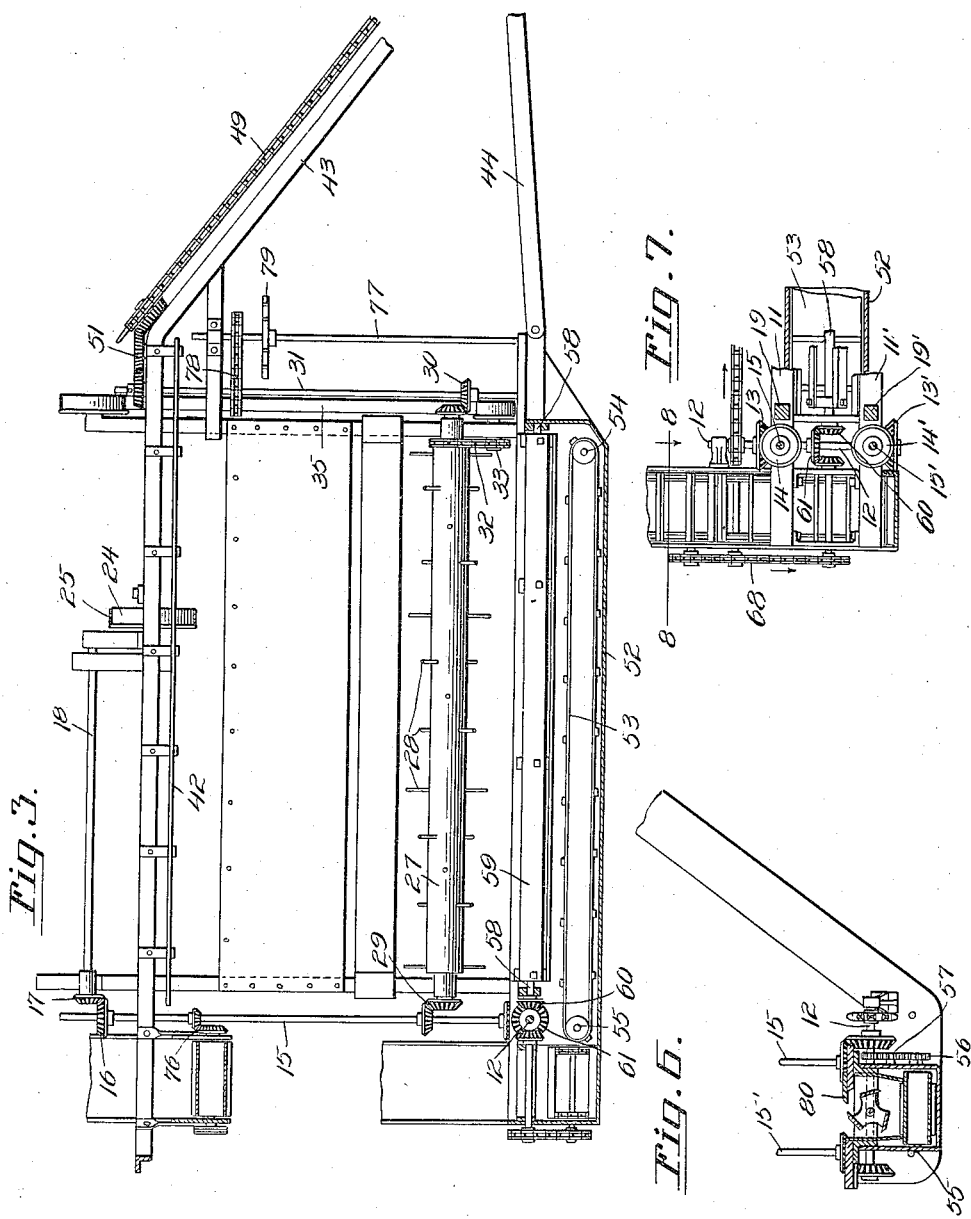

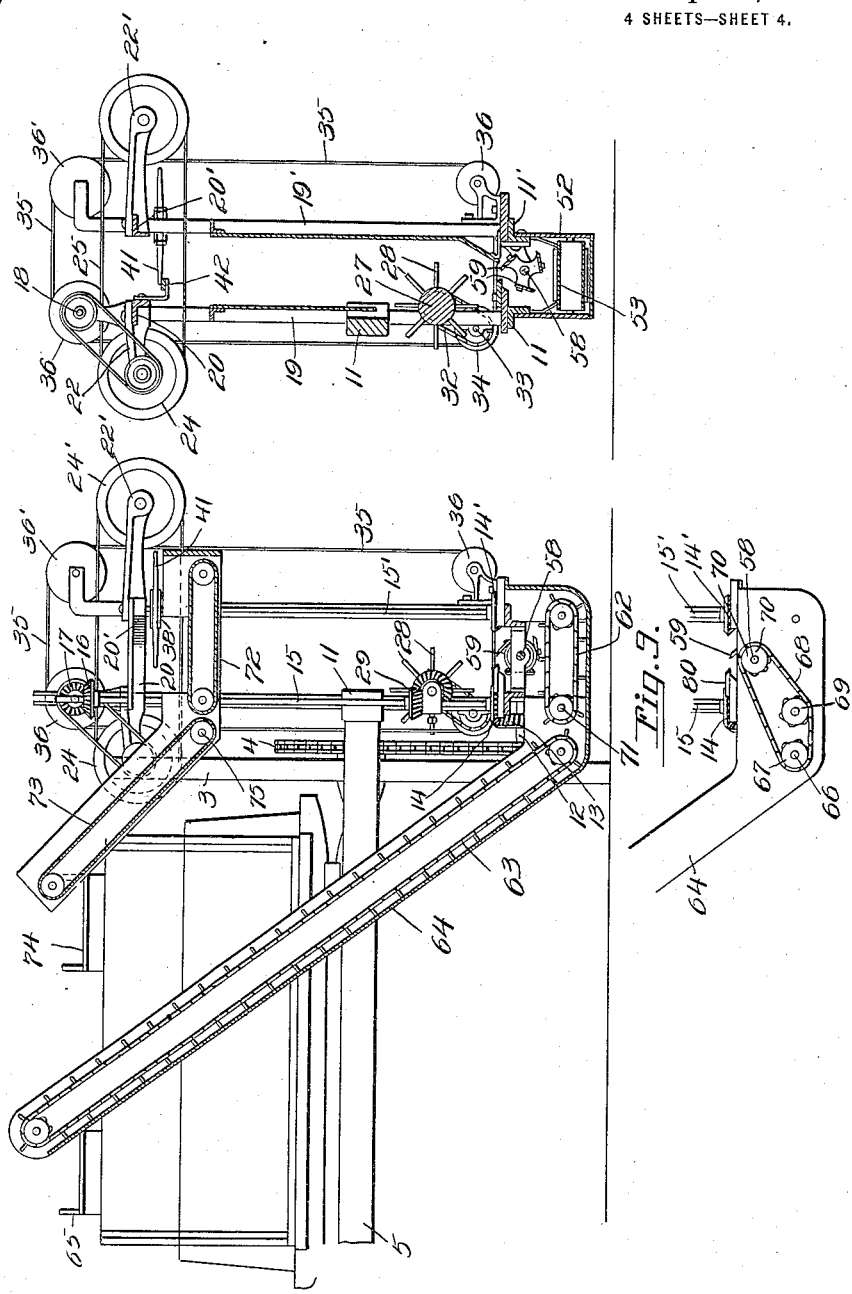

UNITED STATES PATENT OFFICE.

WILLIAM WELCH, OF HASKELL, TEXAS, ASSIGNOR OF ONE-FOURTH TO FIDELLIA D. WELCH, OF HASKELL, TEXAS.

STALK-HEADER AND ENSILAGE-CUTTER.

1,154,464.      Specification of Letters Patent.      Patented Sept. 21, 1915.

Application filed December 14, 1911, Serial No. 665,801. Renewed February 12, 1915. Serial No. 7,867.

*To all whom it may concern:*

Be it known that I, WILLIAM WELCH, a citizen of the United States of America, residing at Haskell, in the county of Haskell and State of Texas, have invented new and useful Improvements in Stalk-Headers and Ensilage-Cutters, of which the following is a specification.

This invention relates to harvesting machines of that class which are particularly intended and adapted to cut the heads of stalks for the saving of the seeds of such plants as sugar cane, Kafir corn and the like, and it has for its object to produce a simple and efficient machine whereby this result may be accomplished.

A further object of the invention is to construct a machine of the class described whereby the stalks will also be cut close to the ground for the purpose of utilizing such stalks.

A further object of the invention is to construct a machine of the character described in which means are provided for reducing the stalks to short lengths which may be utilized as ensilage or which may be left upon the ground for fertilizing purposes.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view showing a simple and preferred form of a machine constructed in accordance with the invention. Fig. 2 is a side elevation of the same. Fig. 3 is a longitudinal sectional view taken on the plane indicated by the line 3—3 in Fig. 1. Fig. 4 is a transverse sectional view taken on the line 4—4 in Fig. 1. Fig. 5 is a transverse sectional view taken on the line 5—5 in Fig. 2. Fig. 6 is a sectional detail view taken on the line 6—6 in Fig. 2. Fig. 7 is a sectional detail view taken on the line 7—7 of Fig. 2. Fig. 8 is a sectional detail view taken on the line 8—8 in Fig. 7. Fig. 9 is a detail rear elevation.

Corresponding parts in the several figures are denoted by like characters of reference.

The form of the invention illustrated in the drawings hereto attached shows a machine which is adapted to be mounted for operation upon an ordinary farm wagon, the box of which constitutes a receptacle for the material gathered by the machine. This machine has been shown as adapted to operate upon a single row of plants. It is to be understood, however, that the principles of construction to be hereinafter described may be applied to a larger machine operating upon two or more rows of plants and that when the principles of construction are thus applied the machine may be mounted upon special rotary supporting means, in which event the machine may be adapted to deliver the material gathered thereby into a wagon driven alongside.

Referring to the drawings, 1 designates the bed or box of an ordinary farm wagon, and 2 is the rear axle having transporting wheels 3, 3, one of which is equipped with a sprocket wheel 4. The harvesting machine is supported upon a U-shaped frame 5 which is pivotally associated with the rear axle, said frame being provided with a forwardly extending arm 6 having a lateral offset 7 which is suitably connected by means of a crank 8 and a link rod 9 with a lever 10 fulcrumed upon the wagon box and which may be conveniently manipulated by the driver or operator for the purpose of tilting the frame 5 and the parts associated therewith to the most convenient position for operation. The lever 10 may be the brake lever which is ordinarily associated with a wagon of this character.

The frame structure of the machine includes sills 11, 11', see Fig. 7, near the rear ends of which a shaft 12 is supported for rotation, said shaft being provided with oppositely faced bevel pinions 13, 13' meshing with bevel pinions 14, 14' upon upright shafts 15, 15'. The shaft 15 is provided near its upper end with a bevel gear 16 meshing with a pinion 17 upon the rear end of the longitudinally disposed shaft 18. Rising from the sills 11, 11' are uprights 19, 19' supporting the plates or cap beams 20, 20', the rear ends of which may be connected by a curved cross member 21. Mounted upon the plates 20, 20' are brackets 22, 22' affording bearings for shafts 23, 23', carrying flanged guide wheels 24, 24' over which an endless flexible cutter 25 is guided. It is to be understood that the guiding means for the endless cutter are to be so proportioned and arranged that sufficient space will be left between the upper and lower leads of the cutter 25 to accommodate the heads that are to be severed from stalks of corn or cane without necessarily subjecting such heads to the action of the upper lead of the cutter whereby such heads would be mutilated. Motion will be transmitted from the shaft 18 to the shaft 23 by means of a belt 26 guided over band wheels or pulleys upon said shafts.

The uprights or standards 19 are provided with bearings supporting the journals of a roller 27 having radially projecting spikes 28 that extend partly through the space between the uprights 19 and 19'. The roller 27 is driven by miter gearing 29 from the shaft 15, and said roller serves to transmit motion through miter gearing 30 to an upright shaft 31 which is supported for rotation in suitable bearings near the front end of the frame structure of the machine. The roller 27 also transmits motion through a transmission chain 32 to a shaft 33 carrying a guide wheel 34. An endless cutter 35 is guided over the guide wheel 34 and over idlers 36 and 36', a plurality of which are suitably supported to guide and support the said endless cutter in such a manner that the upper lead of said cutter will be supported above the normal height of stalks to be engaged by the machine while the lower lead of said cutter is supported at a suitable height above the ground to sever the stalks. The cutter 35 is obviously supported at a suitable distance in advance of the cutter 25 hereinbefore described.

The shaft 15' carries a sprocket wheel 37 which is connected by a chain 38 with a sprocket wheel 39 upon an upright shaft 40 which is supported in suitable bearings adjacent to the front end of the machine where it is suitably spaced from the shaft 31; the latter shaft rising from the sill 11, while the shaft 40 rises from the sill 11'. The links of the chain 38 are equipped with fingers 41 which are terminally supported upon a guide bar 42, as clearly seen in Figs. 1, 3 and 5.

Extending forwardly from the frame structure of the machine are the gathering members which include the inclined arms 43 and the brace members 44, see Fig. 3. Supported for rotation upon the inclined arms 43 near the lower and upper ends of said arms are shafts 45, 46 carrying sprocket wheels 47, 48 over which endless chains 49 are guided, said chains being provided with gathering fingers 50. The sprockets 48 adjacent to the upper ends of the gathering arms are driven through intermediate idlers 51 from the shafts 31 and 40, respectively, whereby motion in the proper direction will be imparted to the chains upon the said gathering arms.

Supported beneath the sills 11, 11' is a trough or casing 52 containing an endless carrier 53, the front and rear ends of which are supported upon shafts 54, 55. The latter shaft carries a pinion 56 meshing with a pinion 57 upon the shaft 12 from which it receives motion. A shaft 58, which is disposed longitudinally in the trough or casing 52 and which is supported in bearings adjacent to the front and rear ends of said trough carries a cutting device comprising a plurality of chopping knives 59. The shaft 58 is provided at its rear end with a bevel pinion 60 meshing with a bevel pinion 61 upon the shaft 12 from which it receives motion. Suitably supported adjacent to the rear end of the carrier 53 is a transversely disposed endless carrier 62 which receives material from the carrier 53 and discharges the same upon the lower end of an inclined carrier 63 supported within a casing 64 adjacent to the rear end of the machine and arranged to discharge over a chute 65 into one side of the wagon box or receptacle 1. The supporting shaft 66 at the lower end of the carrier 63 is provided with a sprocket wheel 67 connected by a chain 68 with sprocket wheels 69 and 70, the former of which is mounted upon one of the supporting shafts 71 of the carrier 62, the other sprocket wheel 70 being mounted upon the cutter carrying shaft 58 and from which motion in the proper direction will thus be transmitted to the carriers 62 and 63, as best seen in Fig. 9.

Suitably supported adjacent to the rear or discharge end of the carrier chain 38 is a transversely disposed carrier 72 which receives the material discharged at the rear end of the chain 38 and discharges said material on to an inclined carrier 73 which discharges over a chute 74 into the receptacle 1. The supporting shaft 75 at the lower end of the carrier 73 is driven by miter gearing 76 from the upright shaft 15, and motion may be transmitted from said carrier shaft 75 in any convenient manner to the carrier 72.

Supported for rotation near the front end of the frame structure of the machine is a vertical shaft 77 which may be driven by a chain transmission 78 from the upright shaft 31 and which carries a beater comprising a plurality of radiating arms 79 which serve to engage the stalks and to project the same in a rearward direction into engagement with the fingers 41 of the carrier 38. A blade 80 adapted to coöperate with the cutters 59 carried by the shaft 58 may be suitably supported upon one of the sills of the machine.

In the operation of this invention, the row of plants is engaged by the carriers 49, 50 upon the guide arms 43, the stalks being thereby moved rearwardly in an upright position until engaged by the beaters 79 and the fingers 41 of the chain 38. This part of the mechanism serves to engage the stalks and to elevate down stalks to an approximately upright position for convenient engagement with the lower lead of the endless knife or cutter 35, whereby the stalks are severed at a suitable distance above the ground. The fingers 41 of the chain 38 will engage the stalks just below the heads, the stalks being carried in a rearward direction while suspended in an upright position by means of the fingers 38 which ride upon the guide bar 42. The spikes 28 of the roller 27 will engage the stalks and pull said stalks downwardly until the heads engage and are supported upon the fingers 41 of the chain 38, thereby presenting the heads in suitable position to be severed by the action of the cutter 25. The heads are carried rearwardly by the carrier formed by the chain 38 and fingers 41, while the stalks are gradually pulled downward by the action of the spikes 28 of the roller 27, the stalks being engaged by the cutters 59 carried by the revolving shaft 58, being thus cut into short lengths which drop upon the carrier 53 in the trough 52. The stalks having thus been chopped may, if desired, be discharged at the rear end of the trough 52, or they may be discharged onto the carrier 62, passing from thence on to the carrier 63, whereby they are delivered over the chute 65 into the wagon box. The heads are delivered by the carrier formed by the chain 38 on to the carrier 72 discharging on to the carrier 73 which discharges over the chute 74 into the wagon box. The latter may be provided with a partition to form compartments for the different products. It is obvious, however, that when the seeds are saved, the stalks will usually be discharged upon the ground to serve as fertilizing material, while when ensilage is to be made it is not usually desired to save the seeds. Suitable discharge means for the various carriers will be arranged according to the purpose for which the machine is employed.

As will be seen from the foregoing description, taken in connection with the drawings hereto annexed, I have provided a simple and efficient machine whereby the seeds of corn and cane stalks may be efficiently saved, and whereby such stalks may be chopped for such use as may be desired.

Having thus described the invention, what is claimed as new, is:—

1. In a machine of the character described, stalk gathering and carrying means including an endless chain supported in an approximately horizontal plane, horizontally disposed fingers extending from the links of the chain, a guide bar terminally supporting the fingers said guide bar being adjacent to and spaced from one lead of the chain, a longitudinally disposed spiked roller supported for rotation beneath the chain in position to engage the stalks and to pull the stalks downwardly until the heads rest on the fingers that are terminally supported by the guide bar, thereby alining the heads with respect to the supporting chain, a cutter to sever the heads from the stalks after being alined, and means for actuating the chain, the cutter and the spiked roll.

2. In a machine of the character described, stalk gathering and carrying means including an endless chain supported in an approximately horizontal plane, the links of said chain being provided with laterally extending fingers, a guide bar terminally supporting the fingers, said guide bar being adjacent to and spaced from one lead of the chain, stalk severing means, means for pulling downwardly the stalks carried between the fingers of the chain until the heads rest upon the fingers and are thereby supported in proper alinement, means for severing the heads thus alined from the stalks and means for chopping the stalks that are being pulled downward.

3. In a machine of the character described, stalk gathering and carrying means including an endless chain supported in a horizontal plane, the links of said chain being provided with laterally extending fingers, a guide bar terminally supporting the fingers, said guide bar being adjacent to and spaced from one lead of the chain, stalk severing means arranged below the carrier chain near the front thereof, means operating on the stalks carried by the chain to pull said stalks downwardly while in transit, cutting means for severing the heads which arrest the downward movement of the stalks by impinging on the fingers of the carrying chain, the means operating to pull the stalks downwardly being constructed and arranged to continue operatively in engagement with the stalks after the heads have been severed, and means for chopping the stalks while being pulled downward.

In testimony whereof I affix my signature in presence of two witnesses.

WILLIAM WELCH.

Witnesses:
M. W. CANTRELL,
W. D. WELCH.